United States Patent
Hermsmeyer et al.

(10) Patent No.: US 7,396,151 B2
(45) Date of Patent: Jul. 8, 2008

(54) CONDITIONER

(75) Inventors: Andrea Hermsmeyer, Constance (DE); Philipp Hanimann, St. Gallen (CH)

(73) Assignee: Buhler AG, Uzwil (CH)

(*) Notice: Subject to any disclaimer, the term of this patent is extended or adjusted under 35 U.S.C. 154(b) by 252 days.

(21) Appl. No.: 10/948,464

(22) Filed: Sep. 24, 2004

(65) Prior Publication Data

US 2005/0146983 A1    Jul. 7, 2005

Related U.S. Application Data

(63) Continuation of application No. PCT/CH03/00198, filed on Mar. 26, 2003.

(30) Foreign Application Priority Data

Mar. 26, 2002  (DE)  ................... 102 13 737
Jul. 8, 2002    (DE)  ................... 102 30 817

(51) Int. Cl.
  *B01F 7/04*   (2006.01)
  *B01F 7/08*   (2006.01)

(52) U.S. Cl. ............... 366/158.1; 366/158.4; 366/320; 426/519; 426/520

(58) Field of Classification Search ............. 366/155.1, 366/155.2, 156.1, 156.2, 158.1, 158.4, 320; 426/519, 520
See application file for complete search history.

(56) References Cited

U.S. PATENT DOCUMENTS

| | | | |
|---|---|---|---|
| 1,422,102 A * | 7/1922 | Hutchinson | 426/622 |
| 1,449,280 A | 3/1923 | Ginn | |
| 1,452,871 A * | 4/1923 | Dienst | 426/465 |
| 1,570,086 A * | 1/1926 | Schaffer | 425/205 |
| 1,690,753 A | 11/1928 | Renneburg | |
| 1,793,638 A | 2/1931 | Rowton et al. | |
| 2,494,891 A * | 1/1950 | Marshall | 510/145 |
| 2,521,398 A * | 9/1950 | North | 99/466 |
| 2,785,455 A * | 3/1957 | McElroy | 425/203 |
| 4,312,265 A * | 1/1982 | Enterline et al. | 99/348 |
| 4,659,299 A | 4/1987 | Pierik | |

FOREIGN PATENT DOCUMENTS

| EP | 0 231 764 B1 | 1/1987 |
|---|---|---|
| EP | 0 610 789 A1 | 2/1994 |
| GB | 1106445 | 3/1968 |

* cited by examiner

*Primary Examiner*—David L Sorkin
(74) *Attorney, Agent, or Firm*—Buchanan Ingersoll & Rooney PC

(57) ABSTRACT

A conditioner and a method are disclosed for the production of food or animal foodstuffs. The conditioner includes at least one detention element and a mixer which is located thereabove, and is provided with a dosing element. The mixer and the detention element have the same face plates enabling them to be connected to each other on at least one front side.

16 Claims, 3 Drawing Sheets

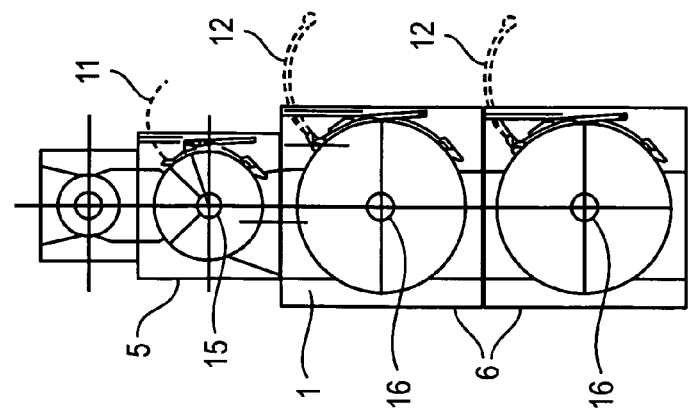
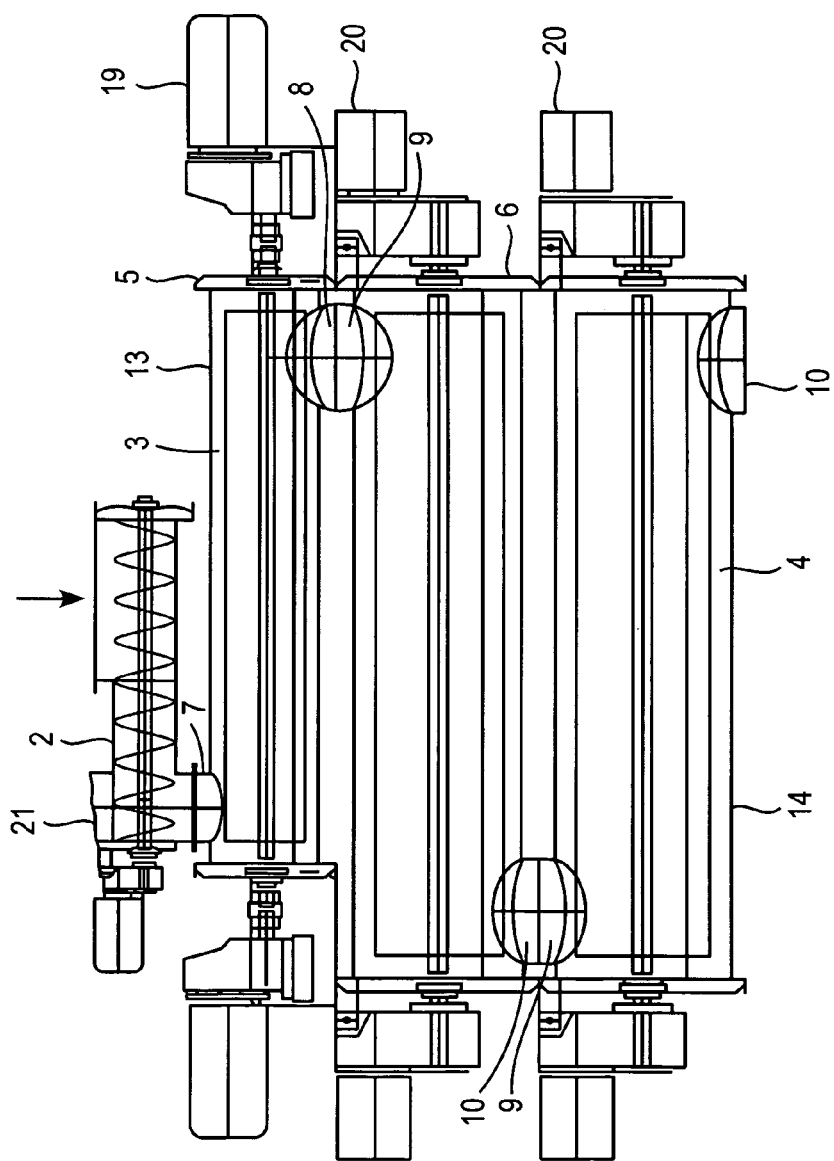

CONDITIONER

CROSS REFERENCE TO RELATED APPLICATIONS

This application claims priority under 35 U.S.C. §119 to German Application No. 102 13 737.4 filed in Germany on 26 Mar. 2002 and to German Application No. 102 30 817.9 filed in Germany on 8 Jul. 2002, and as a continuation application under 35 U.S.C. §120 to PCT/CH03/00198 filed as an International Application on 26 Mar. 2003 designating the U.S., the entire contents of which are hereby incorporated by reference in their entireties.

BACKGROUND

The present invention relates to a conditioner, in particular for the production of conditioned foodstuffs or animal foods.

Conditioners are used individually as processors or in conjunction with pressing or expander plants in the preparation of animal foodstuffs or foodstuffs. These are generally mixers, in which a product for processing is processed over a certain period thermally or hydrothermally. This processing serves to render the products hygienic, and to improve the nutritional value and/or the product structure.

Such mixers are known for example from EP-B-231764 and EP-B-610789. In this example a dosing device is connected upstream of such a mixer and a compression mould or an expander is supplied from the mixer. The mixer is provided with a heating mantle and contains a rotating shaft, which is equipped with mixing and conveying elements.

Such units are either tailored to use in pressing or expander plants, or can be used stand-alone only, since the expense of adapting them is high.

According to EP-B-610789, for warming the product-guiding parts and units, an air cycle is provided with a ventilator, a connecting line, an air heater, a lower air connection arranged on the side of the product output channel with an air inlet channel, an air input channel with an upper air connection arranged on the side of the product supply channel, whereby the air is guided from the product output channel via the compression mould, the product supply channel, the feeder and mixer to the products input channel.

Solutions to energy recovery are also known in processors, in which for example the waste heat of an expander plant is utilized.

SUMMARY

A conditioner is disclosed, which can be adapted with minimal complications for different areas of application.

The conditioner can be built completely modular, so that adaptations in capacity or the like can be done exclusively by changing the number of single units and/or varying their length and/or diameter. A conditioner can include a dosing element, at least one mixer and also at least one detention element. According to this solution the faceplates of all units can be interchanged and can be provided with heating insulation or heating elements.

Drives, rotors and working elements can be changed uncomplicatedly via the faceplates on both sides of mixer and detention element. Configurations without detention elements are also feasible.

The conditioner can be configured for continuous operation.

A process is also disclosed for producing conditioned foodstuffs or animal foods, which process enables the manufacture of defined conditioned products.

In the known heating modes using recirculation of hot steam from pressing or expander plants there is the considerable risk that the yet-to-be-conditioned product is impaired with respect to taste and/or structurally.

In exemplary embodiments of the present invention, hot air alone can be used for heating and drying procedures (sterilizing), and in an operating mode where it is guided past the dosing element and detention element, to be able to siphon off steam. Steam is supplied to the mixer.

On the contrary, heating can be done in concentric running including the press or the expander. The press is fitted with a bypass for heating the transition area to a cooler connected downstream, in order to achieve the greatest freedom from Salmonella etc.

BRIEF DESCRIPTION OF THE DRAWINGS

The invention will now be described in greater detail hereinbelow in an embodiment with reference to a diagram, in which:

FIG. 1 shows an exemplary conditioner in a main illustration;

FIG. 2 shows the exemplary conditioner of FIG. 1 in section;

DETAILED DESCRIPTION

Figure 3:
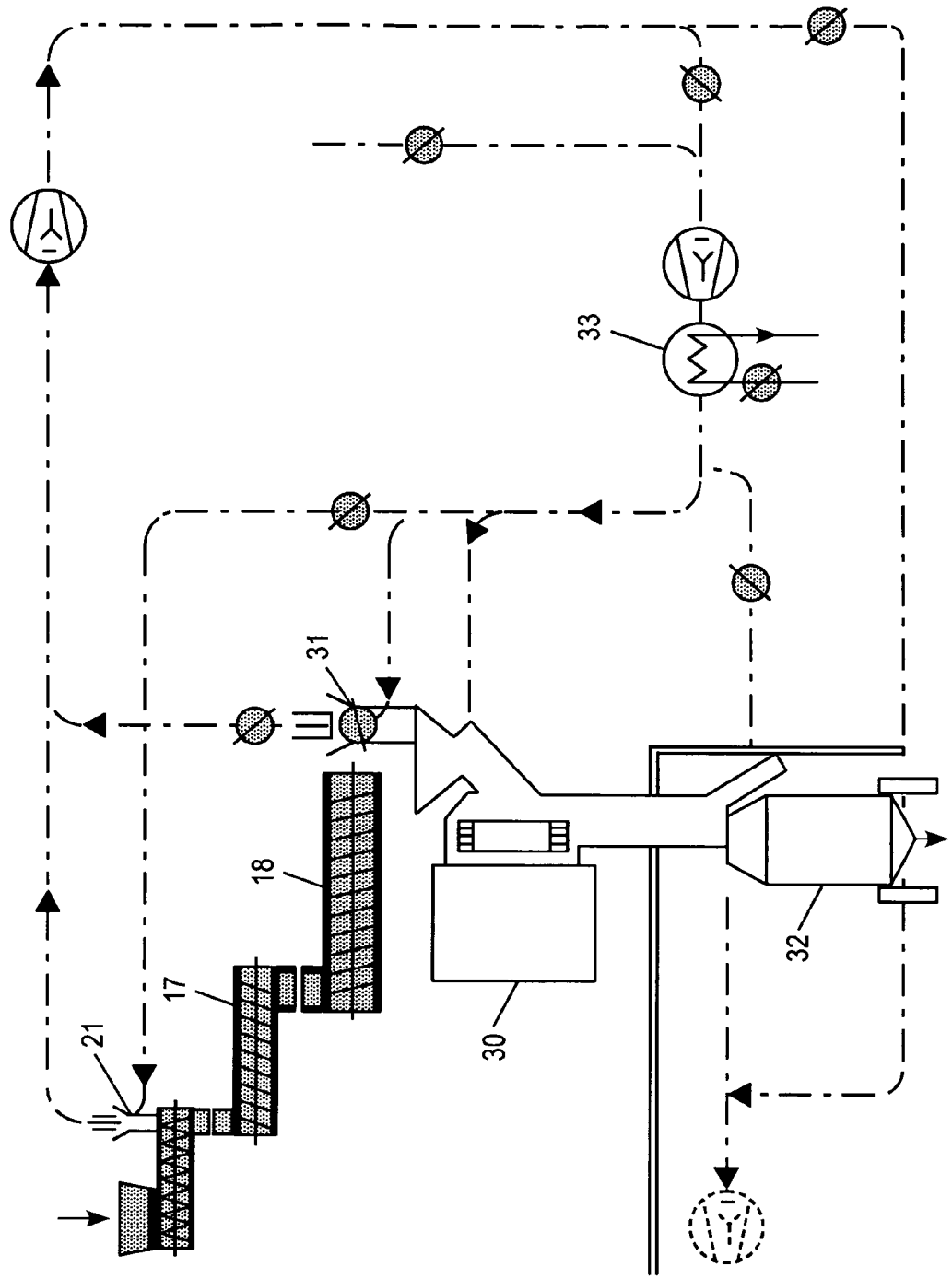
FIG. 3 shows an exemplary schematic representation of a dicing press plant.
Figure 4:
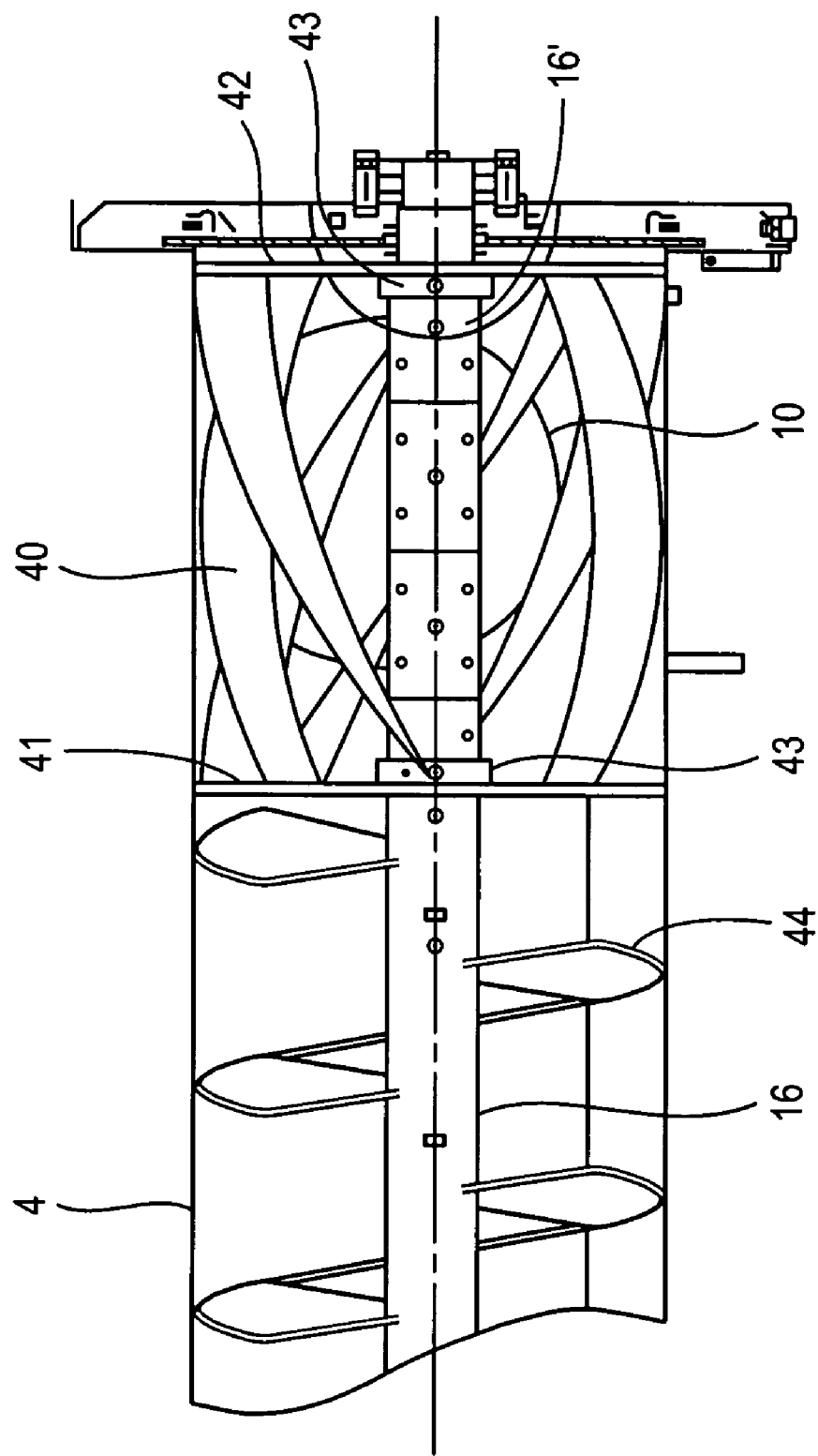
FIG. 4 shows an exemplary detention element (section).

An exemplary conditioner 1 contains a dosing element 2 (screw dosing element), a mixer 3 and two detention elements 4 (in FIG. 3 only one detention element 4 is shown to simplify), which are arranged above one another and form a conditioning module. The mixer 3 and the detention element 4 in each case exhibit identical faceplates 5 or 6, by means of which the module arrangement is also effected.

The product is guided via the corresponding product supply openings 7, 9 or product discharge openings 8, 10. The product is transferred via the product discharge opening 10 of the lower detention element 4 into a dicing press 30. A flange to the product supply opening 7 of the mixer 3 attaches the dosing element 2.

The mixer 3 has a fast-running rotor for intensive product mixing with steam, gases and/or fluids. On the contrary, the detention element 4 is fitted with a slow-running rotor. In the detention element 4 the heated, mixed product is maintained at a defined temperature for a specific period.

Mixer 3 and detention element 4 have tightly closing openings 11 or 12 in the respective mantle 13 or 14. The mantles 13 or 14 are tubular and are fully fitted with heating mats and insulation means, as are the openings 11, 12 and faceplates 5, 6. The inner sides of the mantles 13, 14, including the product transfer openings (reference numerals 7 to 10), can be completely smooth.

Mixer 3 and detention element 4 contain rotors 15 or 16 with working elements 17, 18. These can be designed as screws or paddles. Paddles are designed to overlap, preventing the product from baking onto the inner housing wall of mixer 3 or detention element 4. Drive units 19, 20 are attached externally to the rotors 15, 16. The rotors 15, 16 comprise identical segments, so that they can be easily exchanged, and only a small space is required for expansion and exchange. The rotor shafts can be designed as hollow shafts.

To change a rotor 15, 16 or similar it suffices merely to remove the drive unit 19 or 20 or more precisely a front plate 5, 6 and take out the rotor after loosening the opposite bearing. The drives 19, 20 can be arranged selectively right or left.

All components can be compatible and can be combined.

Compared to the mixer 3 and the dosing element 2 the detention element 4 has a slower rotor speed, so that the capacity of the single units is to be phased for continuous operation.

The rotor 16 of the detention element 4 is equipped in the region of the product discharge opening with helically twisted, band-like mixing and conveying elements (baffle plate 40), which enable continuous, high, even product flow to the dicing press 30. In particular, due to the product easily being pulled over its movement should be distorted and pulsing of it should be damped.

The baffle plates 40 are arranged between wheels 41, 42 and with these can form a component group. The wheels 41, 42 can have spokes which enable unhindered product flow. The wheels 41, 42 are arranged on the rotor 16 of the detention element 4 by means of the usual bearings 43.

The design of the baffle plates 40 and their number can vary with the capacity or structure of the conditioner 1. A minimum of 4 baffle plates is provided, and up to ca. 16 such baffle plates 40 are also possible.

Additional paddles can be provided on the rotor shaft, as desired or as required.

For heating a dicing press plant the dicing press 30 is first charged by a flow heater 33 with hot air and in particular compression mould/press rollers and product inlet are heated, as is known for example from EP-B-610789, the disclosure of which is hereby incorporated herein by reference. By way of the product discharge opening 10 of the lower detention element 4 the hot air then enters the upper detention element 4 and the mixer 3, dries and heats these up and is then siphoned off via a degassing opening 21 of the dosing element 2.

In operating mode (FIG. 3) however the hot air is already siphoned off at a valve 31 of the product inlet of the dicing press 30. In addition, hot steam, which is fed to the mixer 3 in operating mode, is also siphoned off at the degassing opening 21 of the dosing element 2.

Impairment of the product properties by excess heat supply is avoided, and in particular hot steam can be prevented from crossing over in acceleration and run-out periods, when there is only a little product in the conditioner 1.

In the heating and drying mode hot air is fed from the heater in concentric running. All relevant devices can be sterilised in the process, including a transition region from the dicing press 30 into the cooler 32 (incl. bypass).

In operating mode hot air is fed to the cooler 32 and to the door of the dicing press 30 and fed past the conditioning system.

After they leave the dicing press 30 the pellets are cooled in a cooler 32 and then forwarded to other stations in the usual manner.

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A conditioner, comprising:
   at least one detention element with a rotor;
   a mixer arranged above the at least one detention element, the mixer and the at least one detention element being connected to one another such that a product pass results; and
   a dosing element arranged above the mixer,
   wherein the detention element comprises paddles and, in a region of a product discharge opening, is provided with helically twisted mixing and conveying elements, and the mixing and conveying elements are band-like baffle plates arranged between wheel-shaped elements and connected via the wheel-shaped elements to the rotor of the detention element.

2. The conditioner as claimed in claim 1, wherein the mixer and detention element are closed on both front sides by face plates and have rotor shafts configured as hollow shafts.

3. The conditioner as claimed in claim 2, wherein the face plates of a front side can be connected such that a module arrangement results.

4. The conditioner as claimed in claim 1, wherein rotors of the mixer and detention element each comprise at least one segment.

5. The conditioner as claimed in claim 1, wherein mantles of the mixer and detention element and their face plates and product transfer openings of the conditioner are provided with heating means or heat-insulation means.

6. The conditioner as claimed in claim 1, wherein 4 to 12 baffle plates are arranged.

7. A process for manufacturing conditioned animal foods or foodstuffs in the conditioner as claimed in claim 1, comprising:
   forming conditioned products in a pressing or expander plant; and heating and/or drying at least the pressing or expander plant and mixer and detention element with hot air from a heater and conveying steam to the mixer, the hot air being at least one of:
   siphoned off by a product discharge opening of the detention element in operation; or blocked by the supply to the conditioner.

8. The process as claimed in claim 7, wherein the hot air or steam is also siphoned off at the dosing element.

9. The process as claimed in claim 7, wherein in a heating and drying mode, the hot air is guided in concentric running through the pressing or expander plant, detention element, mixer and dosing element, including a transition region of the product from the pressing or expander plant into a cooler.

10. The process as claimed in claim 9, wherein hot air in a bypass is guided from the heater to the cooler.

11. The process as claimed in claim 7, wherein in an operating mode, the hot air is guided in concentric running via a degassing opening of the dosing element and to the pressing or expander plant.

12. The conditioner as claimed in claim 1, wherein the baffle plates are used for evening product flow and a uniform product discharge.

13. The conditioner as claimed in claim 5, wherein a region, adjoining the dosing element, a compression mold of a dicing press and supply and discharge channels to the compression mold are heated by the heating means.

14. A conditioner, comprising:
   at least one detention element with a rotor, the detention element being closed on both front sides by face plates;

a mixer arranged above the at least one detention element, the mixer and the at least one detention element being connected to one another such that a product pass results;

wherein the detention element comprises, only in a region of a product discharge opening, helically twisted mixing and conveying elements arranged between wheel-shaped elements.

15. The conditioner as claimed in claim 14, wherein the mixing and conveying elements are baffles, and the conditioner further comprises a dosing element arranged above the mixer.

16. The conditioner as claimed in claim 14, wherein the detention element and mixer are closed on both front sides by identical face plates to provide a module arrangement.

* * * * *